(12) United States Patent
Brown et al.

(10) Patent No.: US 7,621,119 B2
(45) Date of Patent: Nov. 24, 2009

(54) HEAT EXCHANGE INJECTOR FOR USE IN A ROCKET ENGINE

(75) Inventors: William S. Brown, Newbury Park, CA (US); Richard M. Frey, Palmdale, CA (US)

(73) Assignee: United Technologies Corporation, Hartford, CT (US)

( * ) Notice: Subject to any disclaimer, the term of this patent is extended or adjusted under 35 U.S.C. 154(b) by 523 days.

(21) Appl. No.: 11/479,082

(22) Filed: Jun. 30, 2006

(65) Prior Publication Data

US 2009/0241511 A1    Oct. 1, 2009

(51) Int. Cl.
*F02K 9/00* (2006.01)

(52) U.S. Cl. .......................................... 60/257; 239/403

(58) Field of Classification Search .................... 60/257, 60/258, 267, 260; 239/424, 399, 403
See application file for complete search history.

(56) References Cited

U.S. PATENT DOCUMENTS

| | | | | |
|---|---|---|---|---|
| 1,513,624 A | * | 10/1924 | Parker | 239/404 |
| 1,860,347 A | * | 5/1932 | Crowe | 239/403 |
| 1,872,409 A | * | 8/1932 | Coberly | 239/403 |
| 2,540,666 A | * | 2/1951 | Goddard | 60/258 |
| 3,270,499 A | * | 9/1966 | Escher | 60/258 |
| 3,446,024 A | * | 5/1969 | Dahlberg et al. | 60/258 |
| 3,479,819 A | * | 11/1969 | Bogue | 60/258 |
| 3,662,960 A | * | 5/1972 | Mitchell et al. | 239/400 |
| 3,702,536 A | | 11/1972 | Gregory | |
| 3,871,173 A | | 3/1975 | McKenna | |
| 4,621,492 A | | 11/1986 | von Pragenau | |
| 4,707,982 A | * | 11/1987 | Wagner | 60/258 |
| 5,265,415 A | | 11/1993 | Cox, Jr. | |
| 5,660,039 A | * | 8/1997 | Sion et al. | 60/258 |
| 5,704,551 A | * | 1/1998 | Schmidt et al. | 239/403 |
| 6,205,770 B1 | | 3/2001 | Williams et al. | |
| 6,755,359 B2 | * | 6/2004 | Sprouse et al. | 239/405 |
| 6,832,471 B2 | | 12/2004 | Hewitt | |
| 6,860,099 B1 | * | 3/2005 | Xenofos et al. | 60/258 |

* cited by examiner

Primary Examiner—Ted Kim
(74) Attorney, Agent, or Firm—Kinney & Lange, P.A.

(57) ABSTRACT

A heat exchange injector assembly includes a heat exchange element comprising a fuel sleeve, a liquid oxidizer post disposed in the fuel sleeve, and a multi-passage swirl member such as a double helix member, disposed in the liquid oxidizer post.

22 Claims, 6 Drawing Sheets

HEAT EXCHANGE INJECTOR FOR USE IN A ROCKET ENGINE

BACKGROUND

The present invention relates to a heat exchange injector suitable for use in an expander cycle rocket engine. More particularly, the present invention relates to a heat exchange injector including a double helix member for encouraging gasification of an oxidizer in a rocket engine operating over a broad throttle range, e.g., from about full thrust to about 5% of full thrust.

In a liquid propellant rocket engine, a fuel (e.g., liquid hydrogen) and an oxidizer (e.g., liquid oxygen) are pumped into a combustion chamber, where they burn to create a high pressure and high velocity stream of hot gases. A nozzle subsequently accelerates the hot gases further. The hot gases exit the nozzle, thereby creating thrust.

One type of bipropellant rocket engine, which uses a separate fuel and oxidizer, is an expander cycle which, because of its relative simplicity, is preferred in orbit transfer or descent/ascent rocket engine missions where maximum flexibility and ease of operation is required. In one type of an expander cycle, fuel is heated by heat from a main combustion chamber of the rocket engine. More specifically, liquid fuel is fed into coolant passages in the walls of the combustion chamber. The combustion chamber heats the fuel, while the fuel simultaneously cools the combustion chamber. When the fuel is heated to a certain temperature, the fuel undergoes a change from liquid to gaseous state. The pressure from the expansion of the fuel creates pressure, which drives the turbines that drive fuel and oxidizer pumps.

A bipropellant expander cycle rocket engine also includes an injector, where fuel and oxidizer are metered, mixed, and ignited into the combustion chamber in a controlled manner. A heat exchange injector utilizes heat from gasified fuel (which is gasified by the heat of the combustion chamber during the expansion cycle) to gasify the oxidizer.

BRIEF SUMMARY

The present invention is a heat exchange injector assembly suitable for use in an expander cycle rocket engine. The heat exchange injector assembly includes a plurality of heat exchange elements. Each heat exchange element includes a fuel sleeve, a liquid oxidizer post disposed in the fuel sleeve, and a multi-passage swirl member disposed in the liquid oxygen post. The multi-passage swirl member promotes the gasification of an oxidizer, even at relatively low propellant flows, which enables the rocket engine to operate at thrust levels ranging from about full thrust to about five percent of full thrust.

DETAILED DESCRIPTION

Figure 1:
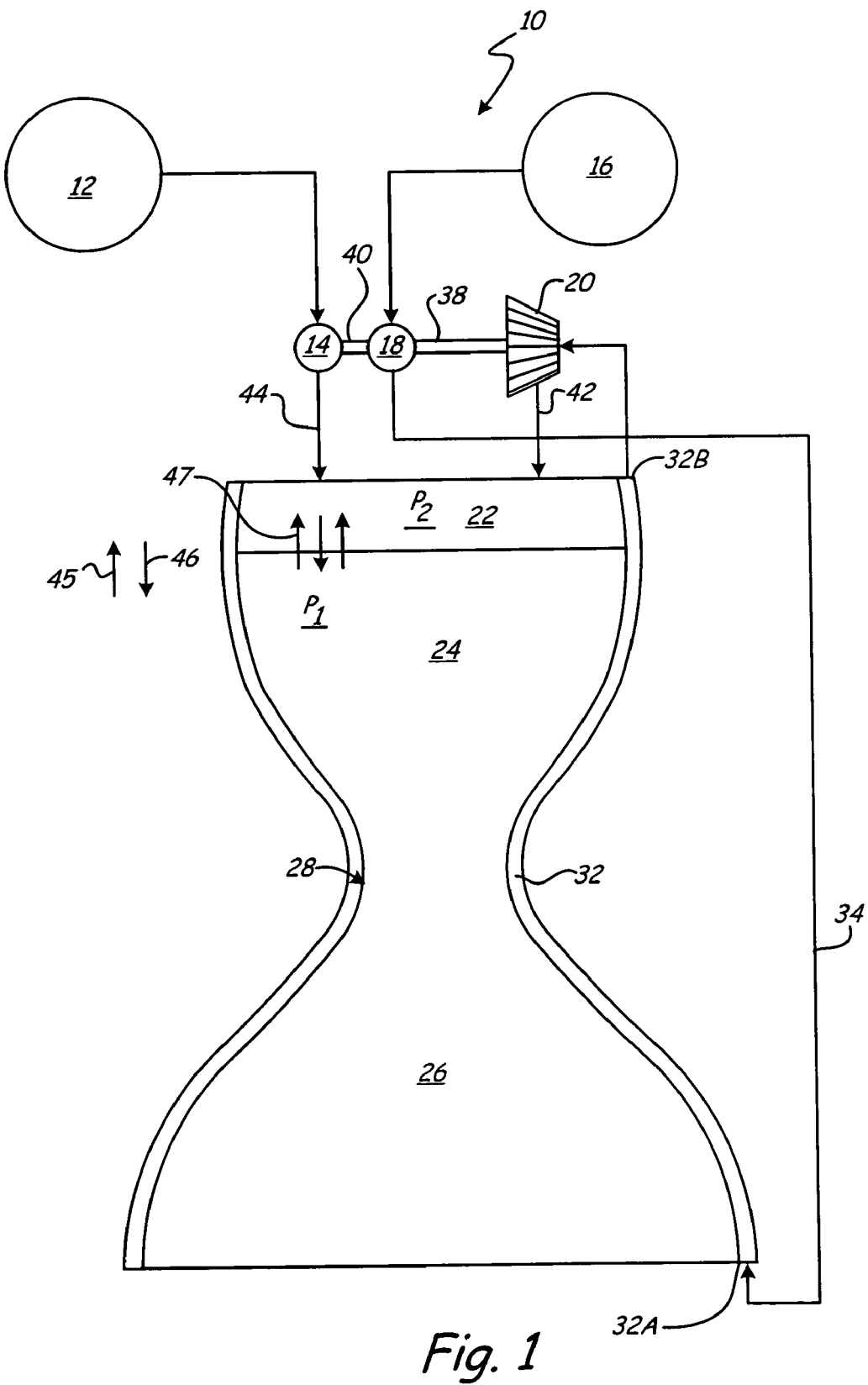
FIG. 1 is a schematic diagram of an expander cycle rocket engine including propellant tanks, propellant pumps, a turbine for driving the pumps, an injector assembly, a combustion chamber, and a nozzle, and illustrates the flow of propellants through the rocket engine.

FIG. 1 is a schematic diagram of expander cycle rocket engine 10, where additional components such as valves, flow sensors, and pressure sensors have been removed for clarity of illustration. Rocket engine 10 includes oxidizer tank 12, oxidizer pump 14, fuel tank 16, fuel pump 18, turbine 20, heat exchange injector assembly 22, combustion chamber 24, nozzle 26, throat 28, which is positioned between combustion chamber 24 and nozzle 26, and cooling jacket 32. As known in the art, jacket 32 is positioned around an outer surface of combustion chamber 24 and nozzle 26, and includes cooling channels that extend from inlet 32A to outlet 32B. Oxidizer tank 12 and fuel tank 16 store propellants. In the embodiment shown in FIG. 1, oxidizer tank 12 stores liquid oxygen ("LOX") and fuel tank 16 stores liquid hydrogen. Any suitable oxidizer and fuel may be used in alternate embodiments. The propellants are stored in oxidizer tank 12 and fuel tank 16 at a relatively low temperature, low pressure, and low energy level.

The propellants stored in oxidizer tank 12 and fuel tank 16 are gasified prior to being introduced into combustion chamber 24 in order to increase the flammability of the propellants, which increases the efficiency of rocket engine 10. Typically, by gasifying the propellants prior to burning in a combustion chamber 24, less propellant is necessary to produce the same amount of thrust. As a result, the weight of rocket engine 10 including fuel may be reduced and/or the vehicle payload may be increased.

In order to begin converting the oxidizer to a gaseous state, oxidizer pump 14 first increases the pressure of the oxidizer, so that after running through oxidizer pump 14, the oxidizer is still in its liquid state, but exhibits a low temperature, higher pressure, and low energy level. The oxidizer is fed to injector assembly 22, where the oxidizer is converted to gaseous oxygen. Injector assembly 22 includes heat exchange elements (e.g., heat exchange elements 58 of FIGS. 2A and 2B) in accordance with the present invention, which efficiently converts the oxidizer to gaseous oxygen.

In order to gasify the fuel (e.g. liquid hydrogen) stored in fuel tank 16 prior to introducing the fuel into combustion chamber 24, fuel pump 18 pumps liquid fuel from fuel tank 16 to inlet 32A of jacket 32 (in a direction indicated by line 34), which includes cooling channels for circulating the liquid fuel. Liquid fuel emerging from fuel pump 18 exhibits a low temperature, higher pressure, and low energy. As the liquid fuel moves through jacket 32, the liquid fuel is heated by heat from combustion chamber 24, which exerts a high temperature along outer wall 36 as a byproduct of the combustion that occurs within combustion chamber 24. Combustion chamber 24 heats the liquid fuel, while at the same time, the liquid fuel cools combustion chamber 24. When the liquid fuel is heated to a certain temperature, the liquid fuel undergoes a change from a liquid to a gaseous state.

Gaseous fuel emerging from outlet 32B of jacket 32 enters turbine 20, and the pressure from the expansion of the fuel drives turbine 20. Turbine 20 actuates drive shaft 38, which drives fuel pump 18, and drive shaft 40, which drives oxidizer pump 14. In alternate configurations of rocket engine 10, turbine 20 turns a single shaft that drives both oxidizer pump 14 and fuel pump 18. The heated fuel exits turbine 20, and is subsequently introduced into injector assembly 22 at a high temperature, high pressure, and high energy, as represented by line 42.

Injector assembly 22 introduces gasified propellants into combustion chamber 24, as well as atomizes the propellants in a controlled fashion. More specifically, injector assembly 22 meters the flow of propellants into combustion chamber 24 and controls the fuel to oxidizer mixture ratio in order to achieve an efficient combustion in combustion chamber 24. By atomizing the propellants prior to introduction into combustion chamber 24, injector assembly 22 helps increase the efficiency of rocket engine 10. While gasified fuel is introduced into injector assembly 22 (as represented by line 42), oxidizer is introduced into injector assembly 22 in a liquid state. Therefore, injector assembly 22 converts oxidizer to a high temperature, high pressure, and high-energy gasified form prior to introducing oxygen into combustion chamber 24. This process is described in further detail below, in reference to FIGS. 2A and 2B.

It is beneficial for rocket engine 10 to be capable of throttling at thrust ranges from about 100% to about 5% of full thrust (i.e., a 20:1 throttle ratio) in order for rocket engine 10 to be adaptable to soft landings or orbit transfers. In order to achieve less than full thrust, propellants are introduced into combustion chamber 24 at a lower flow rate than at full thrust. Due to the lower propellant flow rate at less than full thrust, it has been found that when existing rocket engines operate at less than 100% of full thrust, the difference in pressure ($\Delta P$) is small between pressure $P_1$ in combustion chamber 24 and inlet pressure $P_2$ of propellants upstream of combustion chamber 24. The upstream direction is indicated by arrow 45 and the downstream direction is indicated by arrow 46.

As a result of the small $\Delta P$, any uneven combustion that occurs in combustion chamber 24 results in an unstable pressure oscillations (as indicated by arrows 47) between combustion chamber 24 and propellant flow upstream of combustion chamber 24. Combustion occurring in combustion chamber 24 may "push" the propellants upstream (indicated by arrow 45). It is generally undesirable for propellants to move upstream because it increases the possibility that the propellants will combust upstream, i.e., other than in combustion chamber 24. If propellants combust upstream of combustion chamber 24, rocket engine 10 may experience "hard-starts" during the ignition process. Further, upstream combustion may damage rocket engine 10 hardware (e.g., melting of hardware). A greater $\Delta P$ helps decouple the flow through injector assembly 22 from the natural variations in combustion chamber 24 pressure that occur during the combustion process. The greater propellant pressure $P_2$ (attributable to a substantial gasification of liquid oxidizer by injector assembly 22) helps form a pressure "wall" that helps block oscillations of pressure between combustion chamber 24 and injector assembly 22.

Injector assembly 22 in accordance with the present invention helps increase the pressure $P_2$ of the propellants so that $\Delta P$ between pressure $P_2$ of the propellants upstream of combustion chamber 24 and pressure $P_1$ inside combustion chamber 24 is greater than 7%, even when rocket engine 10 is operating at less than 100% full thrust. A $\Delta P$ greater than 7% helps protect rocket engine 10 hardware upstream of combustion chamber 24. As described blow, injector assembly 22 helps gasify a substantial amount (i.e., greater than 80%) of the oxidizer at throttle levels ranging from about full throttle to about 5% thrust (i.e., a 20:1 throttle ratio), which allows for a more stable operation of rocket engine 10 at a wide range of throttle operations.

Injector assembly 22 in accordance with the present invention enables rocket engine 10 to operate at various thrust levels, including low thrust levels (i.e., low propellant flow levels) because of the ability for injector assembly 22 to substantially gasify the oxidizer prior to introduction into combustion chamber 24. Rather than relying on multiple engines for full thrust and soft landings, injector assembly 22 enables rocket engine 10 to be used for multiple functions because of its ability to function at multiple thrust levels.

After injector assembly 22 injects high temperature, high pressure, and high energy oxidizer and fuel into combustion chamber 24, the oxidizer and fuel are burned in combustion chamber 24, thereby producing a superhigh temperature, superhigh pressure, superhigh energy product. The product of the combustion then moves through throat 28 and expands out nozzle 26, and accelerates by pressing on the inside of nozzle 26. The acceleration of the product of the combustion out nozzle 26 generates thrust.

Figure 2A:
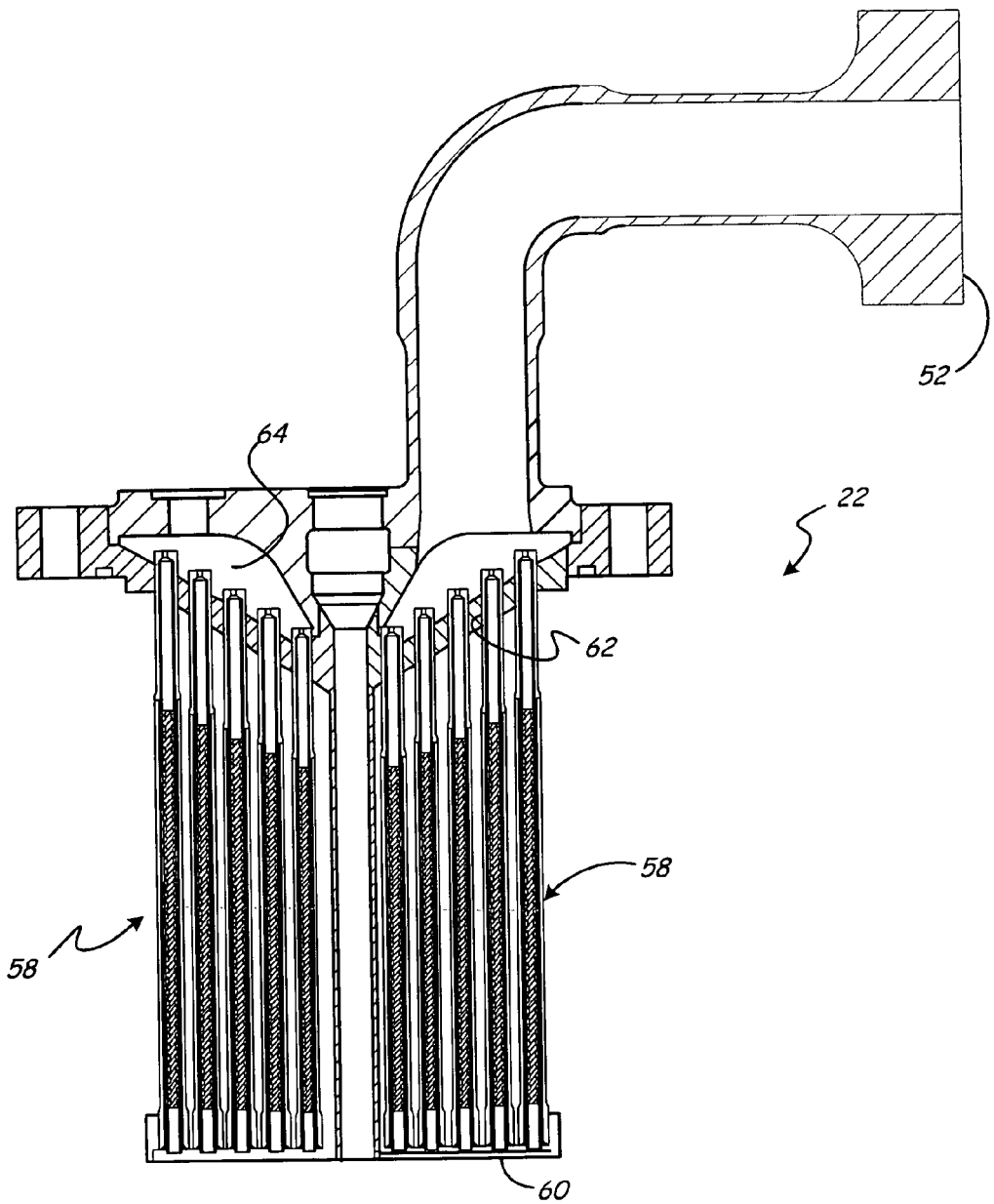
FIG. 2A is a cross-sectional view of a heat exchange injector assembly in accordance with the present invention, which includes a plurality of heat exchange elements.

FIG. 2A is a cross-sectional view of heat exchange injector assembly 22 in accordance with the present invention. In one embodiment, injector assembly 22 is separable from rocket engine 10 for ease of inspection. Injector assembly 22 includes oxidizer inlet 52, and a plurality of heat exchange elements 58. Injector assembly 22 may be referred to as a "heat exchange injector assembly" because injector assembly 22 includes the plurality of heat exchange elements 58 that are configured to encourage an exchange of heat between gaseous fuel and liquid oxidizer in order to gasify the oxidizer. The liquid oxidizer is introduced into injector assembly 22 through oxidizer inlet 52, and is split into multiple streams as it flows through the plurality of heat exchange elements 58, where the liquid oxidizer is gasified. The gasified oxygen is then introduced into combustion chamber 24 after exiting heat exchange elements 58.

Injector assembly 22 is bolted onto rigimesh faceplate 60 and brazed to interpropellant plate 62, onto which oxidizer dome 64 is welded, e.g., by electron beam welding. In alternate embodiments, other suitable means of attaching injector assembly 22, rigimesh faceplate 60, interpropellant plate 62, and oxidizer dome 64 are used. Oxidizer dome 64 and interpropellant plate 62 may be formed of any suitable oxidation and corrosion resistant alloy, such as Inconel IN718, a nickel-based superalloy known in the art. Rigimesh faceplate 60 helps hold heat exchange elements 58 in place, and separates the propellants in injector assembly 22 from the hot gases in combustion chamber 24. Interpropellant plate 62 helps separate the liquid oxidizer and gaseous fuel prior to being introduced into injector assembly 22. In order to prevent inadvertent combustion, it is preferable to keep the liquid oxidizer and gaseous fuel separated until the injection point into combustion chamber 24. Oxidizer dome 64 provides a volume of liquid oxidizer to injector assembly 22.

Figure 2B:
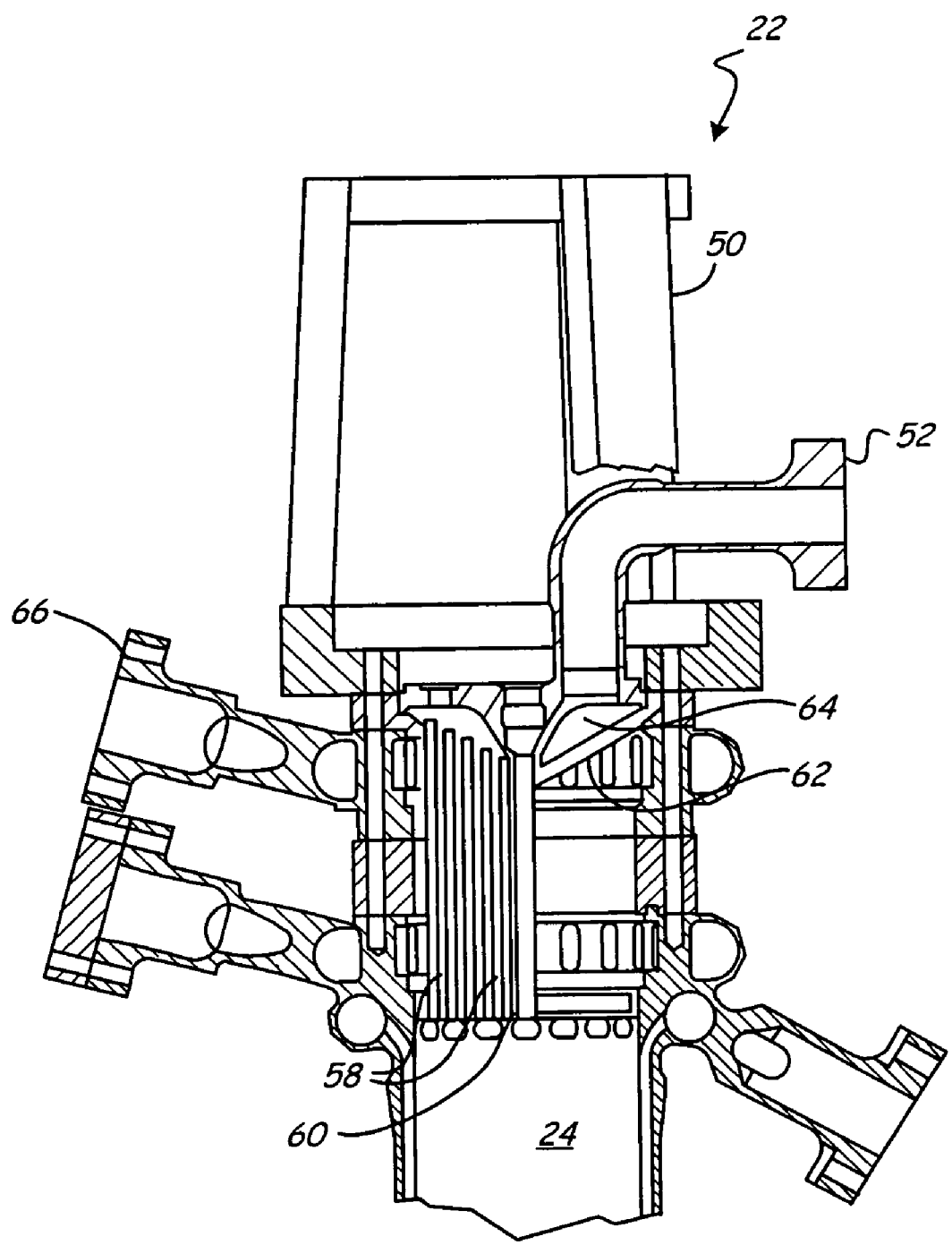
FIG. 2B is a schematic cross-sectional view of the heat exchange injector assembly of FIG. 2A.

FIG. 2B is a schematic cross-sectional view of heat exchange injector 22 in accordance with the present invention, which is attached to thrust mount 50. Gaseous fuel is introduced into injector assembly 22 through fuel inlet and manifold 66 and exits injector assembly 22 into combustion chamber 24. The fuel is already in a gaseous state when it enters injector assembly 22 because, as previously described, the fuel is converted from liquid to gas when the liquid fuel is circulated through jacket 32 (FIG. 1).

Figure 3:
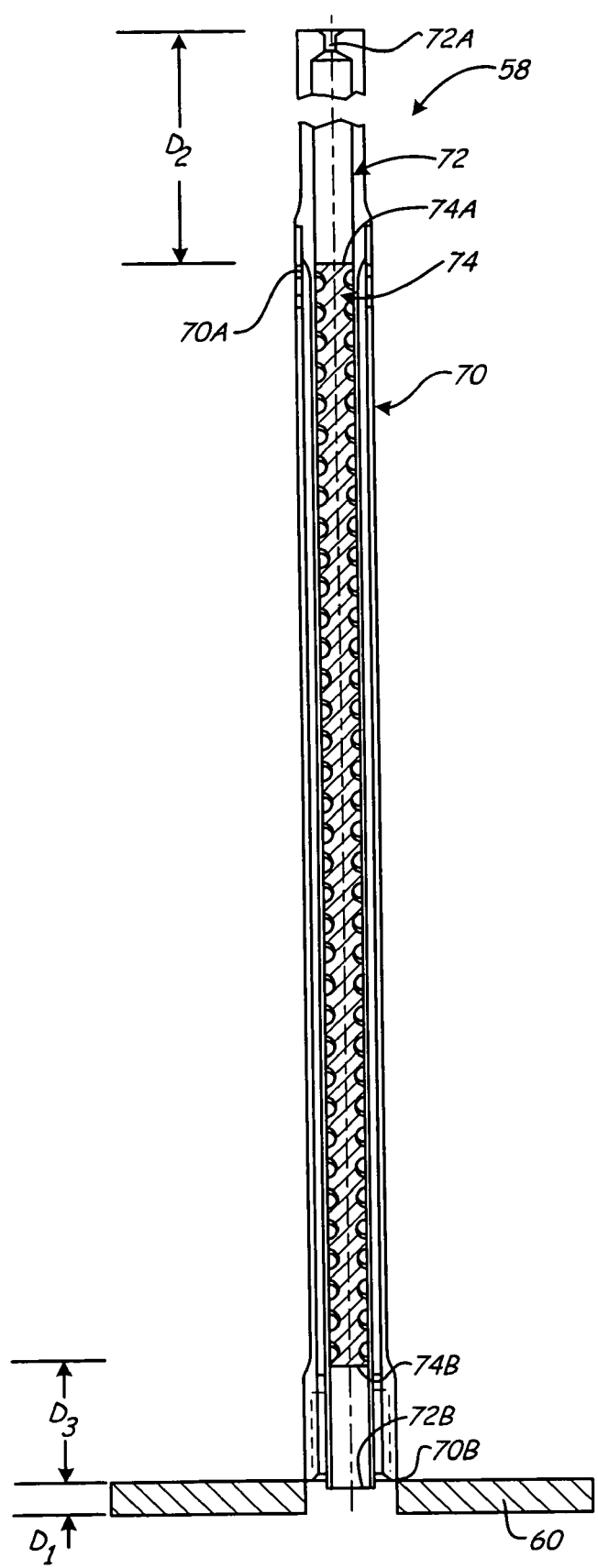
FIG. 3 is a cross-sectional view of a heat exchange element of the heat exchange injector assembly of FIGS. 2A and 2B, where the heat exchange element includes a fuel sleeve, liquid oxidizer post disposed in the fuel sleeve, and a double helix member disposed in the liquid oxygen post.

FIG. 3 is a cross-sectional view of a single heat exchange element 58 of heat exchange injector assembly 22 (FIG. 2A)

in accordance with the present invention. Heat exchange element 58 includes fuel sleeve 70, oxidizer post 72, and double helix member 74 (which is a thermally conductive multi-passage swirl structure). Oxidizer post 72 is brazed to an inner surface of fuel sleeve 70, and double helix member 72 is brazed to an inner surface of oxidizer post 72 using any suitable means known in the art. Fuel sleeve 70 extends from first end 70A to second end 70B, while oxidizer post 72 extends from first end 72A to second end 72B, and double helix member 74 extends from first end 74A to second end 74B. Distance $D_1$ is the distance oxidizer post 72 is recessed from rigimesh faceplate 60. In the embodiment illustrated in FIG. 3, distance $D_1$ is about 0.254 centimeters (0.100 inches). First end 74A of double helix member 74 is recessed distance $D_2$ from first end 72A of oxidizer post 72. Second end 74B of double helix member 74 is recessed distance $D_3$ from second end 72B of oxidizer post 72. In one embodiment, distances $D_2$ and $D_3$ are each about 0.254 (0.100 inches) to about 3.00 centimeters (0.50 inches). In the embodiment illustrated in FIG. 3, distances $D_2$ and $D_3$ are each about 1.27 centimeters (0.50 inches). Distances $D_1$, $D_2$, and $D_3$ may be modified in alternate embodiments in order to accommodate different types of rocket engines.

Figure 4:
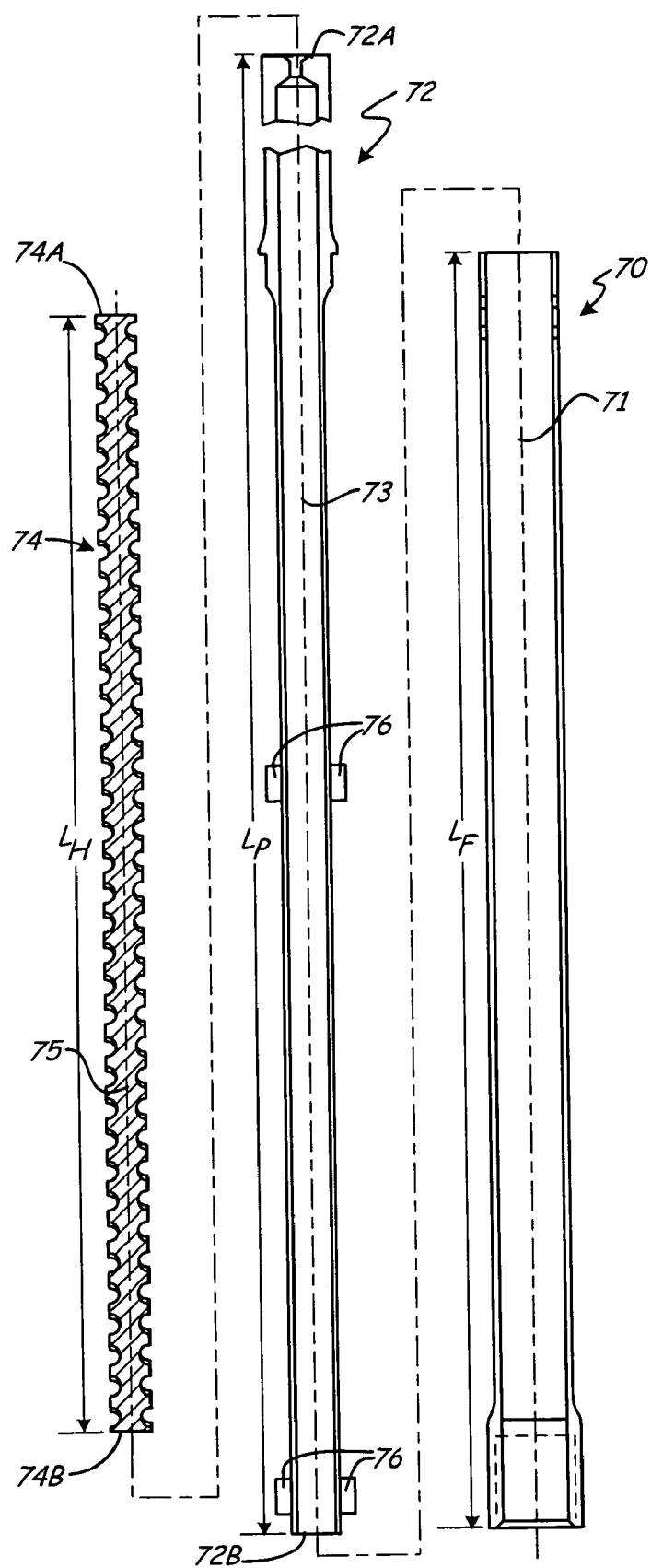
FIG. 4 is an expanded assembly view of the heat exchange element of FIG. 3.

FIG. 4 is an expanded assembly view of heat exchange element 58. Double helix member 74 is configured to fit within oxidizer post 72, which is configured to fit within fuel sleeve 70. Fuel sleeve 70 is formed of any suitable corrosion resistant material, such as 316L stainless steel. Oxidizer post 72 and double helix member 74 are each formed of any suitable oxygen-free, high thermal conductivity, corrosion-resistant material, such as oxygen-free high thermal conductivity copper and alloys thereof. In the embodiment illustrated in FIG. 4, fuel sleeve 70, oxidizer post 72, and double helix member 74 are coaxial. That is, when heat exchange element 58 is assembled, longitudinal axis 71 of fuel sleeve 70, longitudinal axis 73 of oxidizer post 72, and longitudinal axis 75 of double helix member 74 are aligned. Other configurations are contemplated in alternate embodiments, where, for example, longitudinal axes 71, 73, and 75 are not aligned.

In the embodiment of injector assembly 22 shown in FIGS. 2A-5, injector assembly 22 and thus, heat exchange element 58, is configured to fit in an existing 15,000 pound-force (lbf) thrust expander cycle engine hardware. Each heat exchange element 58 has a different length (as shown in FIGS. 2A and 2B, heat exchange elements 58 are arranged in a "step-wise" fashion). Due to the different lengths, each of heat exchange elements 58 exhibits a different natural frequency, which helps prevent heat exchange elements 58 from interfering with the turbomachinery harmonics (e.g., the frequency as a result of combustion in combustion chamber 24) for a 15,000 lbf thrust rocket engine. In order to accommodate the particular 15,000 lbf thrust expander cycle engine, length $L_F$ of fuel sleeve 70 and length $L_P$ of oxidizer post 72 are each in a range of about 15.0 centimeters (about 5.9 inches) to about 17.5 centimeters (about 6.9 inches) and length $L_H$ of double helix member 74 is 11.4 centimeters (about 4.5 inches). The dimensions described herein are merely an example, and are not intended to limit the present invention in any way. The dimensions of injector assembly 22 are adjustable, depending upon the dimensions of the rocket engine into which injector assembly 22 is implemented. In an alternate embodiment, two or more heat exchange elements 58 may have the same length if the effect on the natural harmonics of rocket engine 10 is negligible.

Double helix member 74 is symmetrical about longitudinal axis 75, and has a pitch of about 0.10 centimeters to about 2.0 centimeters. In the embodiment illustrated in FIG. 4, the pitch is about 0.635 centimeters (0.25 inches). The pitch of double helix member 74 may be adjusted to accommodate different types of rocket engine requirements. In one embodiment, double helix member 74 is formed from a rod of oxygen-free, high thermal conductivity copper, which is cut into a double helix structure using a computer-controlled abrasive water jet method.

Oxidizer post 72 and double helix member 74 are formed of a high thermal conductivity material in order to achieve a high level of heat transfer between oxidizer post 72 and double helix member 74. Because double helix member 74 is brazed to oxidizer post 72, the braze metal between oxidizer post 72 and double helix member 74 further promotes heat transfer between oxidizer post 72 and double helix member 74.

Spacers 76 are positioned between oxidizer post 72 and fuel sleeve 70 and help center oxidizer post 72 within fuel sleeve 70. Spacers 76 also help preclude excessive structural loading of oxidizer post 72. In the embodiment shown in FIG. 4, spacers 76 are positioned midway between first end 72A and second end 72B, and at end 72B of oxidizer post 72. The location and number of spacers 76 may be adjusted in alternate embodiments. In order to help promote heat transfer between gaseous hydrogen flowing through fuel sleeve 70 and oxidizer post 72, spacers 76 are preferably formed of an oxygen-free, high thermal conductivity material, such as an oxygen-free, high thermal conductivity copper and alloys thereof. In the embodiment illustrated in FIG. 4, spacers 76 are integrally formed with oxidizer post 72. In an alternate embodiment, spacers 76 are separate from oxidizer post 72 and are attached using any suitable method known in the art, such as brazing or welding. In yet another alternate embodiment, spacers 76 are integral with fuel sleeve 70.

Figure 5:
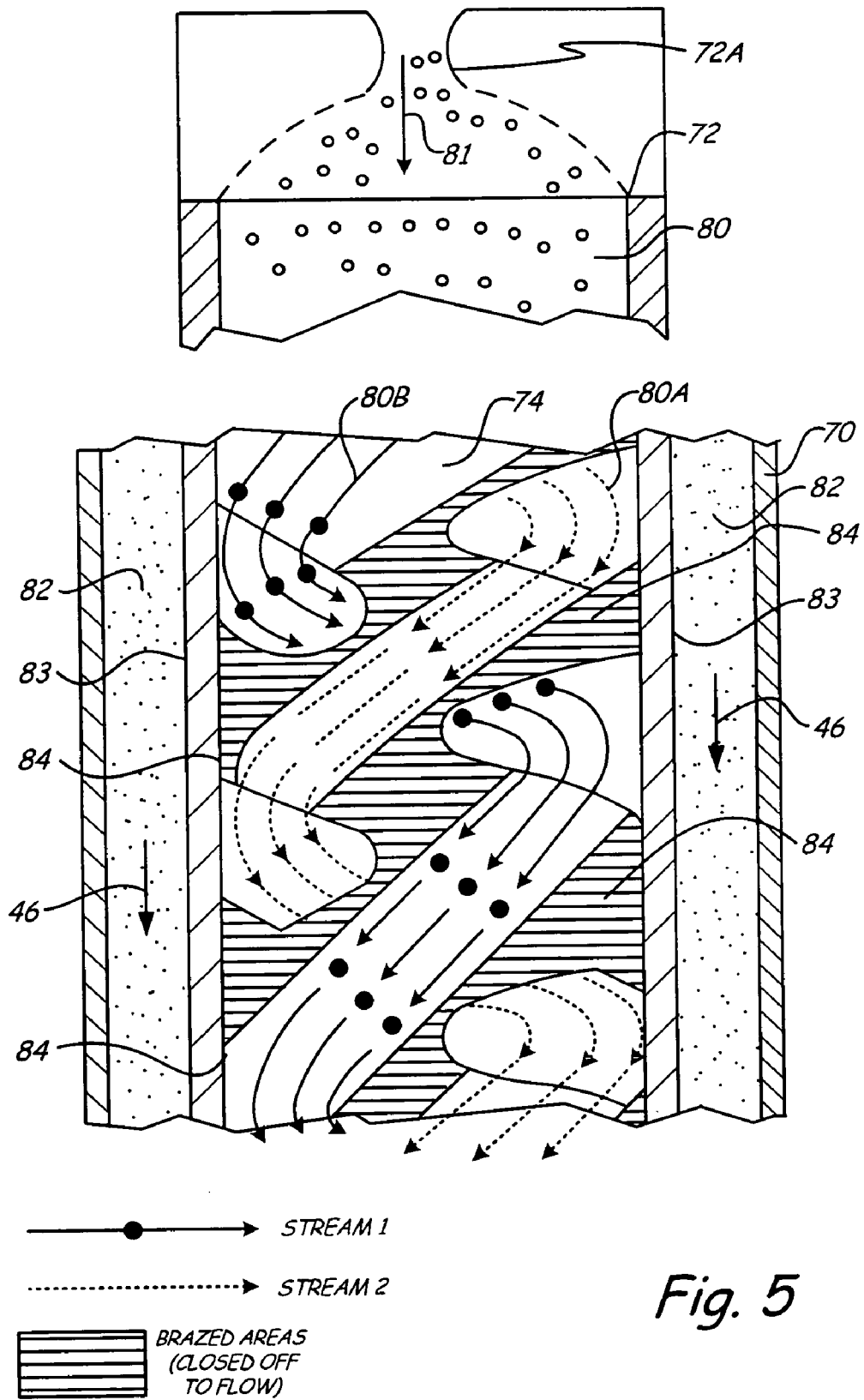
FIG. 5 is a partial schematic cross-sectional view of the heat exchange element of FIGS. 2A and 2B, where oxygen is flowing through the liquid oxidizer post in a downstream direction and gaseous hydrogen is flowing through the fuel sleeve in a downstream direction.

FIG. 5 is a partial schematic cross-sectional view of injector assembly 58, where oxidizer 80 is introduced into first end 72A of oxidizer post 72 (as indicated by arrow 81) and gaseous fuel 82 is introduced into fuel sleeve 70. As FIG. 5 illustrates, fuel sleeve 70 and oxidizer post 72 are brazed together, while double helix member 74 and oxidizer post 72 are brazed together. Braze metal bonds fuel sleeve 70 and oxidizer post 72 at interface 83 between fuel sleeve 70 and oxidizer post 72, thereby allowing thermal energy from hot gaseous fuel 82 to convectively transfer between fuel sleeve 70 and oxidizer post 72. Braze metal bonds double helix member 74 to oxidizer post 72 in regions 84, such that double helix member 74 and oxidizer post 72 are in thermally conductive communication with one another (i.e., heat transfers between oxidizer post 72 and double helix member 74 at regions 84).

Both oxidizer 80 and fuel 82 are flowing in a downstream direction, which is indicated by arrow 46. As previously described, fuel 82 is introduced into heat exchange element 58 of injector assembly 22 from turbine 20. Fuel 82 is, therefore, in a gaseous state and exhibits a high temperature, high pressure, and high energy level when fuel 82 is introduced into fuel sleeve 70 of heat exchange element 58. When oxidizer 80 is introduced into double helix member 74 of heat exchange element 58, oxidizer 80 is in a liquid state (e.g., LOX), and exhibits a low temperature, high pressure, and low energy. It is desirable to introduce gaseous oxidizer into combustion chamber 24. In order to convert oxidizer 80 from a liquid state into a gaseous state, heat is transferred from high-temperature gaseous fuel 82 to the low temperature cryogenic oxidizer 80.

Heat exchange element 58 is configured to help achieve the heat transfer between gaseous fuel 82 and oxidizer 80. As FIG. 3 illustrates, injector element 58 controls a gap between gaseous hydrogen 82 and oxidizer post 72 so that fuel 82, which is flowing at a high velocity in fuel sleeve 70, is in contact with an entire length of oxidizer post 72, thus maximizing heat transfer convection from high temperature gaseous fuel 82 to oxidizer post 72.

Returning now to FIG. 5, oxidizer 80 is split into two separate streams 80A and 80B after oxidizer 80 is introduced into first end 72A of oxidizer post 72. More specifically, oxidizer 80 is forced into streams 80A and 80B by double helix member 74, which defines two separate and parallel paths. As discussed below, splitting oxidizer 80 into more than one stream helps increase the rate of heat transfer Q between fuel 82 and oxidizer streams 80A and 80B.

Heat exchange element 58 promotes conductive heat transfer from gaseous fuel 82 to oxidizer 80 through the use of thermally conductive double helix member 74, which is also heated from high temperature gaseous fuel 82. Specifically, heat is transferred convectively from gaseous fuel 82 to oxidizer post 72, then through conduction to oxygen streams 80A and 80B, as well as from gaseous hydrogen 82 to oxidizer post 72 to double helix member 74, then through conduction to oxidizer streams 80A and 80B. When streams 80A and 80B are heated, the liquid is converted to a gaseous state. Thus, after streams 80A and 80B exit heat exchange element 58, a high percentage of total oxidizer 80 is in a gaseous state and exhibits a high temperature, high pressure, and high energy.

Splitting oxidizer 80 into two separate streams 80A and 80B and utilizing thermally conductive double helix member 74 increases the high temperature surface area to which streams 80A and 80B are exposed. Increasing the high temperature surface area helps heat exchange element 58 gasify a large percentage of oxidizer streams 80A and 80B because, according to thermodynamic principles, the rate of heat transfer between gaseous fuel 82 and oxidizer streams 80A and 80B increases with an increase in cross-sectional area for heat transfer. In convective heat transfer, the rate of heat transfer Q is a product of the cross-sectional area for heat transfer. More specifically:

$$Q = U A \Delta T,$$

where U is the overall heat transfer coefficient, A is the overall cross-sectional area for heat transfer, and $\Delta T$ is the overall temperature difference. Because oxidizer 80 is split into two parallel, but separate streams 80A and 80B that contact both oxidizer post 72 and double helix member 74, which both exhibit a high temperature from gaseous fuel 82, oxidizer 80 is exposed to a greater surface area exhibiting a high temperature, as compared to existing injector assemblies. Otherwise stated, double helix member 74 divides a volume of oxygen 80 into two parallel, but separate streams 80A and 80B moving through oxidizer post 72, which increases the cross-sectional area for heat transfer.

In the embodiment of FIGS. 2A-5, length $L_P$ (shown in FIG. 4) of oxidizer post 72 is greater as compared to existing oxidizer post 72 dimensions, which further increases the high temperature surface area to which oxidizer streams 80A and 80B are exposed. Length $L_P$ is in a range of about 5.9 inches to about 6.8 inches, while in existing oxidizer posts in a 15,000 lb thrust rocket engine, the oxidizer post is about 4.0 inches. As previously discussed, second end 74B of double helix member 74 is recessed distance $D_3$ from second end 72B of oxidizer post 72. Recessing second end 74B of double helix member 74 with respect to second end 72B of oxidizer post 72 provides room for streams 80A and 80B formed by double helix member 74 to recombine prior to exiting oxidizer post 72.

As a result of the shape of double helix member 74, oxidizer streams 80A and 80B undergo a swirling action as they travel through oxidizer post 72. The centrifugal forces caused by the swirling action increases the momentum of streams 80A and 80B, which forces contact between streams 80A and 80B and oxidizer post 72, which is hot due to heat transfer from gaseous fuel 82. Contact between streams 80A and 80B and oxidizer post 72 and double helix member 74, which is conductively heated through brazed contact with oxidizer post 72, promotes the gasification of a significant amount of oxidizer 80 prior to injection into combustion chamber 24 (shown in FIG. 1).

Three-Dimensional Modeling

Heat transfer analysis was conducted using a computerized three-dimensional model of oxidizer post 72 and obtained an accounting of the total conductive, convective, and radiative heat transfer between fuel 82 and oxidizer 80 in injector assembly 22. A 5:1 throttle ratio analytical model run was conducted. At 20% of full thrust (i.e., a 5:1 throttle ratio), oxidizer 80 is in a liquid state (e.g., LOX) at an inlet of injector assembly 22. The heat energy from fuel 82 at 20% of full thrust is lower than the heat generated at full thrust. It was found that by the time streams 80A and 80B flowed halfway down double helix member 74, streams 80A and 80B were each about 80% gas by volume. As a result of the substantial gasification of oxidizer 80, $\Delta P$ between P1 and P2 (FIG. 1) was approximately 10%, which may be an acceptable $\Delta P$ for avoiding unstable pressure oscillations and chugging. In another computerized analysis, it was found that at 5% of full thrust (i.e., a 20:1 throttle ratio), streams 80A and 80B were completely vaporized after flowing through heat exchange element 58.

While an injector assembly in accordance with the present invention has been described with reference to a double helix member disposed in an oxidizer post, in alternate embodiments, any thermally conductive multi-passage swirl member having the ability to split the stream of oxidizer moving through the oxidizer post and comprising a swirl structure may be substituted for the double helix member. For example, the double helix may be substituted with a triple helix member, or two single helical members that are intertwined to form an asymmetrical structure.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A heat exchange injector assembly suitable for use in a rocket engine, the heat exchange injector assembly comprising:
   a liquid oxidizer post extending between a first end and a second end having a length therebetween, and comprising an inner surface and an outer surface;
   an elongate multi-passage swirl element disposed in the liquid oxidizer post adjacent the inner surface and extending a substantial portion of the length of the post between a third end and a fourth end to form a double helical flow passage extending along the multi-passage swirl element and the liquid oxidizer post; and a fuel sleeve disposed about the outer surface of the liquid oxidizer post and extending between a fifth end and a sixth end to form an annular flow passage extending along the fuel sleeve and the liquid oxidizer post;

wherein the annular flow passage extends parallel along a length of the double helical flow passage between the third end and the fourth end to facilitate heat transfer between the annular flow passage and the double helical flow passage.

2. The heat exchange injector assembly of claim 1, wherein the double helix member is coaxial with the liquid oxidizer post such that the double helical flow passage and the annular flow passage are concentric.

3. The heat exchange injector assembly of claim 1 and further comprising a faceplate comprising:
 an injection face;
 a combustion face; and
 a injection bore extending between the injection face and the combustion face;
 wherein the fifth end of the fuel sleeve is joined to the outer surface of the liquid oxidizer post and the sixth end of the fuel sleeve joins to the injection bore at the injection face.

4. The heat exchange injector assembly of claim 3 and further comprising an interpropellant plate comprising:
 a first side;
 a second side facing toward the injection face of the faceplate; and
 an oxidizer bore extending between the first side and the second side;
 wherein the first end of the liquid oxidizer post extends through the oxidizer bore from the second side to the first side such that the fifth end of the fuel sleeve is disposed between the second side and the faceplate.

5. The heat exchange injector assembly of claim 4 wherein the second end of the liquid oxidizer post extends from the sixth end of the fuel sleeve and is disposed within the injection bore of the faceplate.

6. The heat exchange injector assembly of claim 5 wherein the fuel sleeve includes fuel openings disposed near the fifth end.

7. The heat exchange injector assembly of claim 6, and further comprising:
 a first spacer disposed between the outer surface of the oxidizer post and the fuel sleeve.

8. The heat exchange injector assembly of claim 7, wherein the first spacer is positioned at the second end of the oxidizer post.

9. The heat exchange injector assembly of claim 7, and further comprising:
 a second spacer disposed between the outer surface of the oxidizer post and the fuel sleeve, wherein the second spacer is positioned approximately midway between the first and second ends of the oxidizer post.

10. The heat exchange injector assembly of claim 5, wherein the fourth end of the multi-passage swirl element is recessed a distance of about 0.254 centimeters to about 3.00 centimeters from the second end of the liquid oxidizer post.

11. The heat exchange injector assembly of claim 10, wherein the third end of the multi-passage swirl element is recessed about 0.254 centimeters to about 3.00 centimeters with respect to the first end of the liquid oxidizer post.

12. The heat exchange injector assembly of claim 1 wherein the multi-passage swirl element comprises a cylindrical body having double helical channels extending along an exterior surface of the cylindrical body.

13. The heat exchange injector assembly of claim 12, wherein the multi-passage swirl element is brazed to the inner surface of the liquid oxygen post.

14. The heat exchange injector assembly of claim 13, wherein the multi-passage swirl element is formed of a material comprising oxygen-free, high thermal conductivity copper and alloys thereof.

15. The heat exchange injector assembly of claim 14, wherein the multi-passage swirl element has a pitch of about 0.10 centimeters to about 2.0 centimeters.

16. The invention of claim 1 and further comprising:
 a fuel pump configured to feed fuel to the annular flow passage of the heat exchange injector assembly;
 an oxidizer pump configured to feed an oxidizer to the double helical flow passage of the heat exchange injector assembly; and
 a combustion chamber configured to receive fuel and oxidizer from the annular flow passage and the double helical flow passage, respectively.

17. The invention of claim 16 and further comprising:
 a liquid oxidizer dome attached to the first end of the liquid oxidizer post; and
 an interpropellant plate attached to the liquid oxidizer dome.

18. The invention of claim 17, wherein during operation, a difference in pressure between the heat exchange injector and the combustion chamber is greater than or equal to about 7 percent.

19. The invention of claim 16, wherein the fuel pump and the oxidizer pump are turbine driven.

20. The invention of claim 19, wherein the fuel pump and the oxidizer pump are driven by a single turbine.

21. A heat exchange injector assembly suitable for use in a rocket engine, the heat exchange injector assembly comprising:
 a fuel sleeve configured to receive a fuel stream;
 a liquid oxidizer post having a length and configured to receive a liquid oxidizer stream and disposed within the fuel sleeve;
 an elongate means for splitting the liquid oxidizer stream extending a substantial portion of the length of the oxidizer post to promote heat transfer between the fuel stream and the liquid oxidizer stream, wherein the means is disposed within the liquid oxidizer post such that the fuel stream travels parallel along an entire length of the split liquid oxidizer stream and is constructed of a thermally conductive material.

22. The heat exchange injector assembly of claim 21, wherein the means for splitting the liquid oxidizer stream comprises a cylindrical swirl structure having double helical channels extending along an outer surface of the cylindrical swirl structure.

* * * * *